United States Patent [19]
Iversen

[11] Patent Number: 4,585,165
[45] Date of Patent: Apr. 29, 1986

[54] MEANS FOR SETTING THE SWITCHING ON AND OFF PERIODS OF A BURNER OF A HOT WATER HEATING INSTALLATION

[75] Inventor: Kristian Iversen, Sonderborg, Denmark

[73] Assignee: Danfoss A/S, Nordborg, Denmark

[21] Appl. No.: 752,833

[22] Filed: Jul. 8, 1985

[30] Foreign Application Priority Data

Jul. 21, 1984 [DE] Fed. Rep. of Germany ....... 3426937

[51] Int. Cl.$^4$ ............................................. F24D 3/00
[52] U.S. Cl. ................... 237/8 R; 236/46 F; 236/91 F
[58] Field of Search ........... 237/8 R; 236/46 R, 46 F, 236/91 F, 91 E; 165/40

[56] References Cited

U.S. PATENT DOCUMENTS 4,542,849  9/1985  Pichot et al. ................. 236/91 F X Primary Examiner—Henry Bennett
Attorney, Agent, or Firm—Wayne B. Easton

[57] ABSTRACT

The invention relates to a hot water heating system which includes individually operated radiators arranged in parallel. A heat exchanger and a pump supply hot water to the radiators. Control apparatus is included for reducing the on and off switching frequences. The control apparatus includes an integrator which outputs a value which is proportional to the difference between a reference temperature and the temperature at the output of the heat exchanger. The integrator value is fed to a hysteresis switch which switches the heat exchanger on and off when the integrator value reaches the opposite limits of the hysteresis switch.

9 Claims, 5 Drawing Figures

MEANS FOR SETTING THE SWITCHING ON AND OFF PERIODS OF A BURNER OF A HOT WATER HEATING INSTALLATION

The invention relates to means for setting the switching on and off periods of a burner which heats a small heat exchanger of a hot water heating installation with a plurality of radiators connected in parallel and disposed in series and each provided with a valve, preferably a thermostatic valve, wherein the heat exchanger is connected in series with a circulating pump and, parallel thereto, an overflow conduit which has a throttle point, preferably a constant pressure valve, is connected between the supply and return conduits, and wherein provision is made for a temperature sensor measuring the temperature of the water leaving the heat exchanger and a circuit influenced thereby for switching the burner on and off.

Small heat exchangers or boilers are provided particularly for gas-fired hot water heating installations but also for some oil-fired installations. In relation to the burner output, they contain only very little water, for example 0.5 l to 1 l. This is in contrast with the normal oil-fired boilers containing the example 50 to 100 l of water. Since such a small heat exchanger is only very little thermally sluggish, control with a conventional boiler thermostat set for example, to a temperature difference of 6° to 10° C. will lead to a very short switching period, that is to say very frequent switching on and off of the burner, on average 1 start per minute. This is because the temperature increase brought about by the burner in the water flowing through the heat exchanger is considerably larger than the set temperature difference. Such frequency in switching results in a poor efficiency of combustion and a reduced life of the heat exchanger. In addition, there are losses in the chimney and in the surroundings. The noise associated with the switching steps is also often regarded to be annoying.

Means of the aforementioned kind have therefore already become known (DE OS No. 23 02 051), in which a thermostat interrupting the gas supply to the burner at, say, 90° C. is provided with a sluggish response behaviour. This prolongs the switching on and switching off periods. However, this is possible only to a very limited extent because, with excessive sluggishness, there is the danger that, in the case of small and medium amounts of flow, the temperature of the water until response of this thermostat will increase to such an extent that the limiting temperature has in the meantime been exceeded and the entire installation has been switched off. The known equipment also contains a less sluggish thermostat which responds at a somewhat higher temperature, for example, 100° C., and switches the burner as well as the circulating pump off. This ensures that the switching off periods and the combustion times are prolonged when there is a small demand for heat.

The invention is based on the problem of providing means of the aforementioned kind which permit one to operate with comparatively long switching periods irrespective of the demand for heat placed on the heating installation.

According to the invention, this problem is solved in that the circuit comprises an integrator fed with the difference between a predetermined reference temperature and the temperature measured by the temperature sensor, and a hysteresis switch which switches the burner on when the integrated value reaches the one limiting value of the hysteresis switch and off when the integrated value reaches the other limiting value.

With such a construction, the supply temperature is no longer held in the vicinity of a desired value. Instead, the mean temperature of a switching period, i.e. the sum of the switching on and switching off periods, is equal to the desired reference temperature. This makes use of the fact that at the measuring point behind the heat exchanger a temperature value corresponding to the return temperature is already measured shortly after switching the burner off because the circulating pump continues to operate. During the switching on period a temperature is measured that is larger than the return temperature by an amount depending on the amount of flow. The reference temperature lies between these two temperature values. Consequently, the integrator is automatically alternately fed with a positive and a negative temperature difference without changing the measuring point, thereby leading to upwards and downwards integration, respectively. The switching on and off periods are obtained by the integrating times up to reaching the respective limiting value of the hysteresis switch. This automatically takes into account that the switching on periods must be all the shorter, the fewer are the number of radiators traversed by the hot water by reason of the setting of the radiator valves. This is because, when the burner is switched on, the temperature of the water increases more rapidly while flowing through the heat exchanger, the lower is the amount of flow. The integrator is therefore supplied with a correspondingly larger temperature difference, giving a short integrating time for the switching on period. Although the supply temperature fluctuates between two values, if the integration constant is appropriately selected, this will not detract from the degree of comfort in the heated rooms because the radiators respond so sluggishly that the temperature changes become unimportant. The response behaviour of the temperature sensor is of secondary importance to the duration of the switching periods. In particular, rapidly responsive sensors can also be employed.

It is favourable to provide a setting apparatus for fixing the integration constant. This permits adaptation to the conditions of an individual heating installation.

It is also adviseable to provide a setting apparatus for fixing the reference temperature. This enables the temperature to be adapted to the expected demand.

Instead, one can also provide a setting apparatus for fixing a minimum value for the reference temperature and a correcting apparatus which depends on a load parameter to add a load-dependent correcting value. In particular, the correcting apparatus may comprise an external temperature sensor and the external temperature may serve as the load parameter. Such a load-dependent control gives still better adaptation to be expected heat demand.

In a preferred embodiment, the temperature sensor is a temperature-dependent resistor of a bridge circuit of which the bridge voltage is amplified by a bridge amplifier, the setting apperatus for fixing the reference temperature is a voltage divider with adjustable tapping, the integrator comprises an integration amplifier of which the inverting input can be fed with the output signal of the bridge amplifier and the non-inverting input can be fed with a voltage adjustable by means of the voltage divider and the output of which is connected to the inverting input by way of an integration condenser, and the hysteresis switch comprises a switching amplifier of which the inverting input is applied to a fixed voltage, the non-inverting input is connected to the output of the integration amplifier, and the output of which is connected to the non-inverting input by way of an ohmic resistor. It will be evident that the entire equipment can consist of very simple components.

In particular, the inverting input of the integration amplifier should be preceded by a potentiometer by way of the tapping of which the integration condenser is connected. By adjusting the tapping, the integration constant can be varied.

Further, the adjustable voltage may be derivable from a summation resistor to which one can feed a first current adjustable by the setting apparatus and a second current which decreases with an increase in external temperature. In this way, the predetermined temperature is governed by the external temperature. The setting apparatus serves selectively to fix a minimum value for the reference temperature or, if the second current is not being supplied, to set the reference temperature.

Further, a temperature sensor may be employed which responds so rapidly that it can also be used for limiting the maximum temperature. Since one can then dispense with a sensor for rapid switching off when the limiting temperature is reached, one achieves corresponding simplification and economy.

A preferred example of the invention will now be described in more detail with reference to the drawing, in which.

Figure 1:
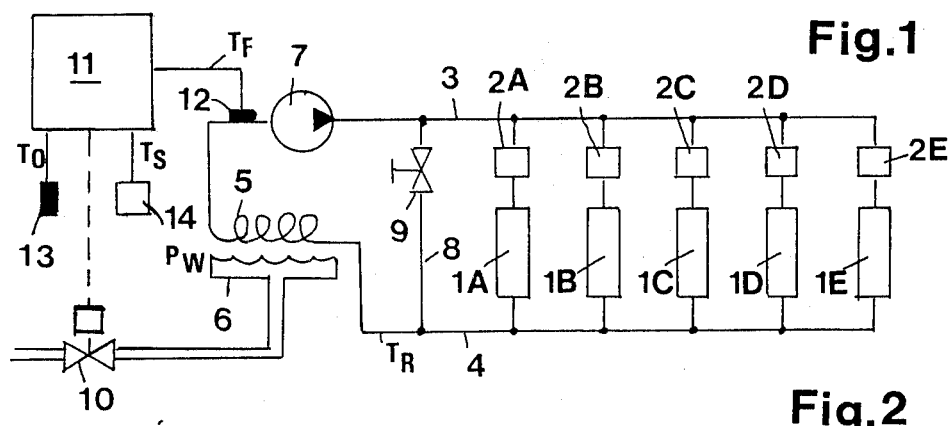
FIG. 1 is a diagrammatic representation of a heating installation with gas burner.

The heating installation shown in FIG. 1 comprises a plurality of radiators 1A to 1E, each of which is preceded by a thermostatic valve 2A to 2E. The radiators are in parallel between the supply conduit 3 and the return conduit 4. A heat exchanger 5 or boiler with very little water content is heated by a gas burner 6. It is in series with a circulating pump 7. In addition, an overflow conduit 8 with an overflow valve 9 and connected between the supply conduit 3 and return conduit 4 tends to keep the pressure between the supply and return constant. The control of the burner is brought about with the aid of a valve 10 adapted to switch the gas supply on and off. It is actuated by a switching apparatus 11 which is fed with a measured temperature $T_F$ from a temperature sensor 12 at the output of the heat exchanger 5 as well as the external temperature $T_o$ from an external temperature sensor 13. In additon, there is a setting apparatus 14 by way of which a reference temperature $T_S$ can be supplied.

When the burner 6 is not switched on, the measured temperature $T_F$ is equal to the return temperature $T_R$. On the other hand, if the burner 6 is switched on, heat energy $P_W$ is transmitted to the water in the heat exchanger 5 or so that its temperature rises by the value $\Delta T$. The temperature rise is inversely proportional to the amount of water flowing through per unit time. With the burner switched on, therefore, the measured temperature $T_F = T_R + \Delta T$ is all the larger, the smaller is the amount of circulated water. If all the radiators 2A to 2E are closed and only the valve 9 is therefore open in the overflow conduit 8, $T_F$ assumes a large value. However, if all the radiators are operating, $T_F$ is small.

Figure 2:
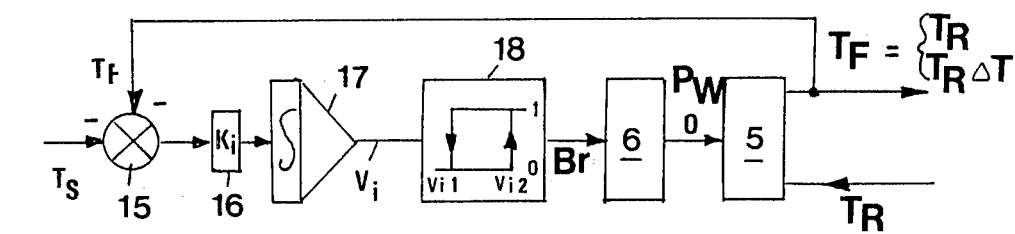
FIG. 2 is a block diagram of the means according to the invention.

The block diagram of FIG. 2 shows that the difference between the measured temperature $T_F$ and the reference temperature $F_S$ is determined in a comparator 15. This difference is multiplied by the factor $K_i$ in a multiplication apparatus 16, and the whole is integrated in an integrator 17. The integration voltage $V_i$ is fed to a hysteresis switch 18 which switches the burner signal $B_r$ to one of the two values 0 to 1 whenever the limiting value $V_{i1}$ or $V_{i2}$ respectively, is reached. The burner 6 therefore transmits either the heat energy $P_W$ or 0 to the heat exchanger 5. A measured temperature $T_F$ is therefore formed at its output that, in the absence of heating, is equal to the return temperature $T_R$ and, with heating, is equal to $T_R$ plus $\Delta T$.

Figure 3:
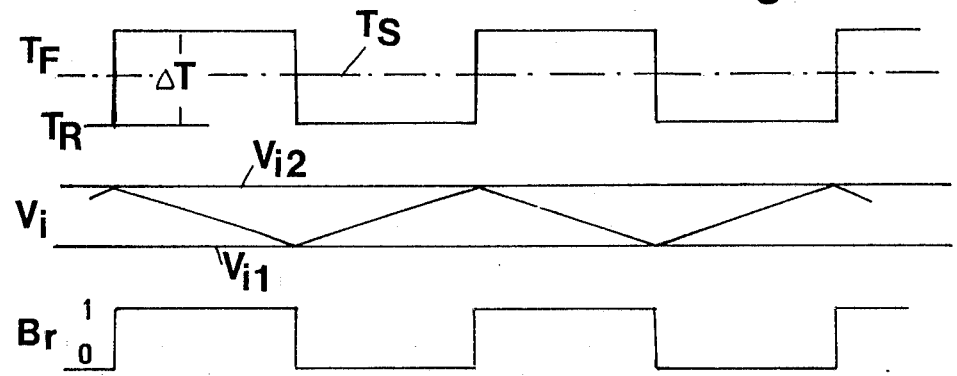
FIG. 3 shows graphs of the measuring temperature $T_F$, the integration voltage $V_i$ and the burner signal $B_r$ against time.
Figure 4:
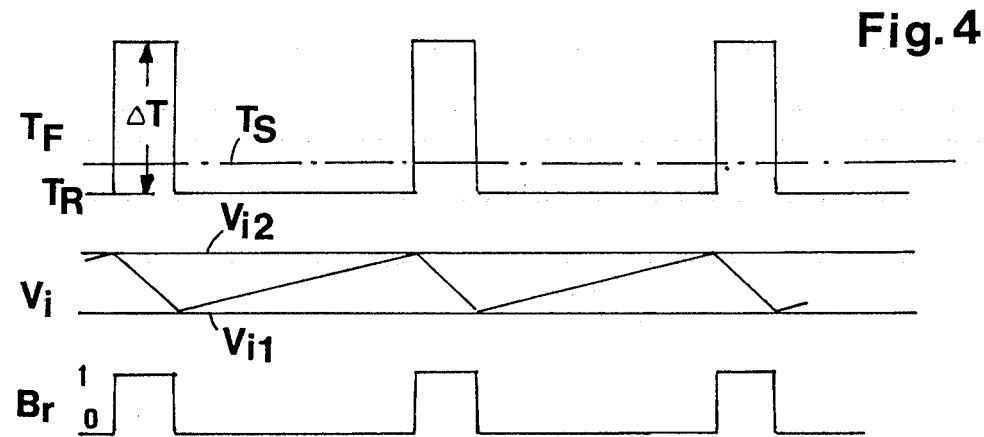
FIG. 4 shows the same behaviour with respect to time in the case of a smaller flow quantity.

This leads to the operation described in conjunction with FIGS. 3 and 4. Here, the zero point in the time curves $T_F$ and $V_i$ is suppressed. The measured temperature $T_F$ alternates as just described between $T_R$ and $T_R + T$. The reference temperature $T_S$ lies therebetween.

Consequently, the integrator 17 alternately integrates upwardly and downwardly, the respective integration time being terminated when the integration voltage $V_i$ has reached one of the limiting values $V_{i1}$ or $V_{i2}$ of the hysteresis switch 18.

In FIG. 3 it has been assumed that a large proportion of the radiators is in operation and, because the amount of flow is large, the temperature increase $\Delta T$ is comparatively small, namely just twice the difference $(T_F - T_R)$. Consequently, as is shown for the time curve of the burner signal $B_r$, one obtains switching on periods for the burner 6 which amount to just 50% of the switching period.

In contrast, it is assumed in FIG. 4 that most of the radiators are shut and, because of the correspondingly low amount of circulated water, the temperature increase T with the burner 6 switched on is considerably larger, namely 5 times the difference $(T_S - T_R)$. Consequently, with the burner switched on, one obtains a steep drop of the integration voltage $B_i$ when integrating the difference $(T_F - T_S)$ and a corresponding short switching on period. The burner signal $B_r$ shows that the switching on period amounts to only about 20% of the switching period. In both cases, however, the switching period is so long that the burner is switched on only about 1 to 10 times per hour, preferably 3 to 6 times per hour.

Figure 5:
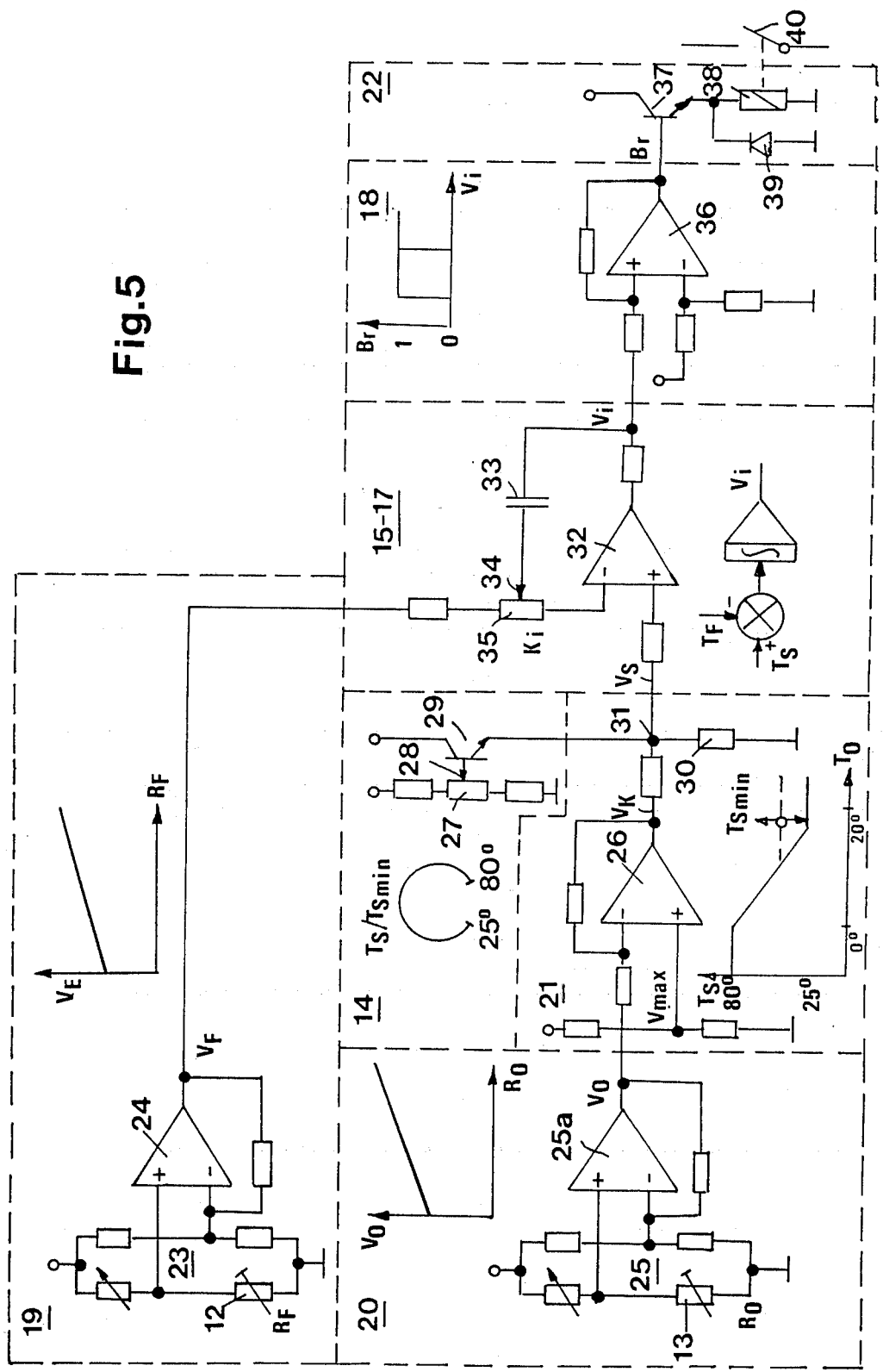
FIG. 5 is a circuit diagram of the means according to the invention.

The circuit of FIG. 5 consists of a plurality of components, namely a measured temperature signal generator 19, an external temperature signal generator 20, the setting apparatus 14, an amplifier 21, a combined comparator-integrator 15 to 17 and the hysteresis switch 18 with a terminating amplifier stage 22.

The measured temperature signal generator 19 comprises the temperature sensor 12 in the form of a temperature-dependent resistor disposed in a bridge circuit 23. A bridge amplifier 24 converts the temperature-dependent resistance $R_F$ into a corresponding voltage $V_F$ according to the illustrated diagram.

The external temperature signal generator 20 comprises the external temperature sensor 13 in the form of a temperature-dependent resistor in a bridge circuit 25 of which the bridge voltage is so converted by a bridge amplifier 25a that the temperature-dependent resistance $R_0$ is converted into a corresponding signal voltage $V_0$ in accordance with the illustrated diagram.

With the aid of a comparator 26, this voltage $V_0$ is compared with a fixed voltage $V_{max}$ to result in a correcting voltage $V_K$.

The setting apparatus 14 contains a voltage divider 27 of which the tapping 28 is connected to the base of a transistor 29. The latter is in series with a summation resistor 30. At the summation point, one can therefore tap a predetermined voltage $V_S$ which, when the setting apparatus 14 is operative alone, corresponds to the setting at the tapping 28 of the voltage divider 27. One can therefore prescribe temperatures of between, say, 25° and 80° C.

If the output of the comparator 26 is also connected to the summation point 31, the signal predetermined by the setting apparatus 14 forms the minimum value corresponding to the predetermined minimum reference temperature $T_{Smin}$ whereas the correcting signal $V_K$ increases with a drop in external temperature, so that the reference temperature $T_S$ is governed by the external temperature $T_o$ as is illustrated in the diagram.

The combined comparator-integrator 15 to 17 comprises an amplifier 32 of which the inverting input is fed with the output voltage $V_F$ of the bridge amplifier 24 that corresponds to the measured temperature and the non-inverting input is fed with the summation voltage $V_S$ corresponding to the reference temperature. The output power is connected by way of a condenser 33 to the tapping 34 of a potentiometer 35 which precedes the inverting input. This enables the integration constant $K_i$ to be set. The integration voltage $V_i$ is obtained at the output of the integrator.

The hysteresis switch 18 again comprises a comparator 36 of which the inverting input is applied to a fixed voltage whereas the non-inverting input is fed with the integration voltage $V_i$. Consequently, the burner signal $B_r$ is obtained at the output.

The latter is fed in the terminating amplifier 22 to a transistor 37 which, when conductive, operates a relay 38 which is bridged by a recovery diode and operates a switch 40 with the aid of which the magnetic valve 10 can be operated to switch the gas supply on.

Altogether, one therefore obtains equipment for operating a burner that is suitable for small heat exchange and can be employed in conjunction with conventional heating installations, whether with or without thermostatic valves. Upon a change in the heat demand in one or more rooms, the mean value of the supply temperature will not change. One obtains a very long switching period so that the efficiency of the heat exchanger is high. The duration of the period can be set with the aid of the integration constant $K_i$ so that one obtains the lowest number of starts per hour with as little fluctuation as possible. In particular, the smallest switching period can be set for medium loads, to become larger for low and high loads. Since the reference temperature is adjustable or can be made to follow the external temperature, the heat loss can be kept to a minimum.

I claim:

1. A hot water heating system, comprising, supply and return conduits, a plurality of individually operated radiators arranged in parallel connected to said supply and return conduits, pump means and heat exchanger means arranged in series with said supply and return conduits for supplying heated water to said radiators, temperature sensor means for determining the outlet temperature of said heat exchanger means, temperature setting means for setting a reference temperature, comparator means responsive to said temperature sensor means and said temperature setting means for generating a differential value corresponding to the difference between said outlet temperature and said reference temperature, integrator means fed with said differential value for generating an integrated value, and hysteresis switch means connected to said integrator means for switching said heat exchanger means on when said integrated value reaches one limiting value of said hysteresis switch means and for switching said heat exchanger means off when said integrated value reaches the other limiting value of said hysteresis switch means.

2. A hot water heating system according to claim 1 including overflow conduit means between said supply and return conduits in parallel with said radiators, and constant pressure valve means in said overflow conduit means.

3. A hot water heating system according to claim 1 including setting means for setting an integration constant for said integrator means.

4. A hot water heating system according to claim 1 wherein said temperature setting means includes a load parameter sensor for adding a load dependent factor to said reference temperature.

5. A hot water heating system according to claim 4 wherein said load parameter sensor is an external temperature sensor and the external temperature serves as a load parameter.

6. A hot water heating system according to claim 1 wherein said temperature sensor means includes a bridge circuit having a voltage output, a bridge amplifier for amplifying said voltage output, and said temperature setting means including a voltage divider with an adjustable tapping.

7. A hot water heating system according to claim 6 wherein said integrator means includes an integration amplifier having an integration condenser and inverting and noninverting inputs, said inverting input being coupled to said bridge amplifier and said noninverting input being coupled to said voltage divider.

8. A hot water heating system according to claim 7 wherein said hysteresis switch means includes a switching amplifier with an inverting input having a fixed voltage and a noninverting input coupled to said integrator means.

9. A hot water heating system according to claim 7 wherein said integrator means includes a potentiometer and a tapping therefor, said integration condenser being coupled between the output of said integrator means and said tapping.

* * * * *